Dec. 22, 1964   F. A. DE PUYDT   3,162,015
VEHICLE DRIVE MECHANISM
Filed May 21, 1963   3 Sheets-Sheet 1

INVENTOR
FRANK A. DE PUYDT
BY Rudolph L. Lowell
ATTORNEY.

Dec. 22, 1964     F. A. DE PUYDT     3,162,015

VEHICLE DRIVE MECHANISM

Filed May 21, 1963     3 Sheets-Sheet 2

INVENTORS.
FRANK A. DE PUYDT

BY *Rudolph L. Powell*

ATTORNEY.

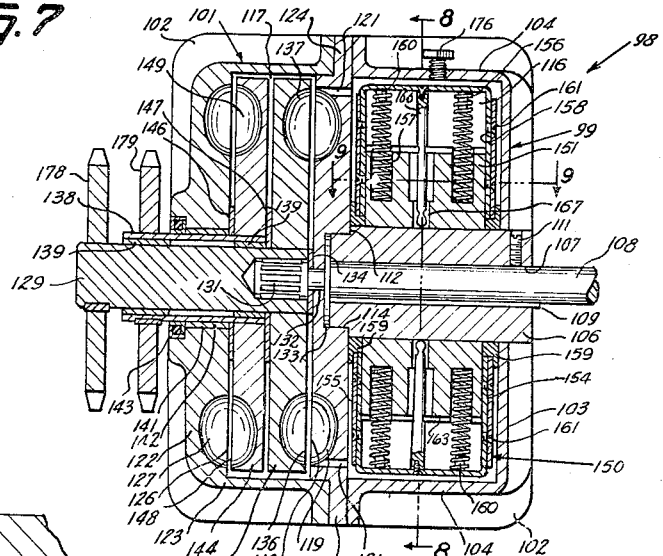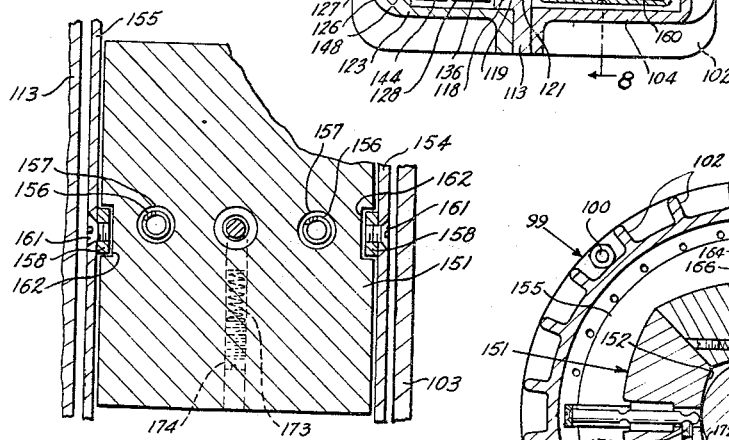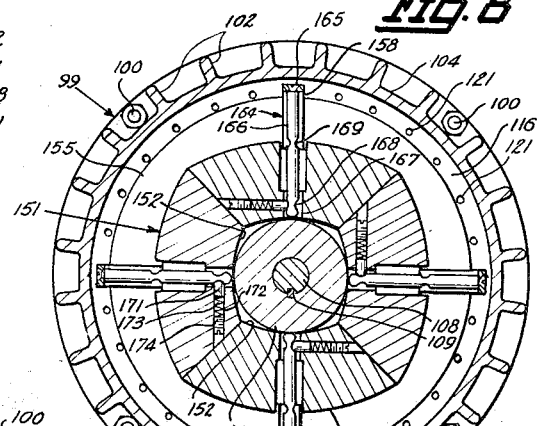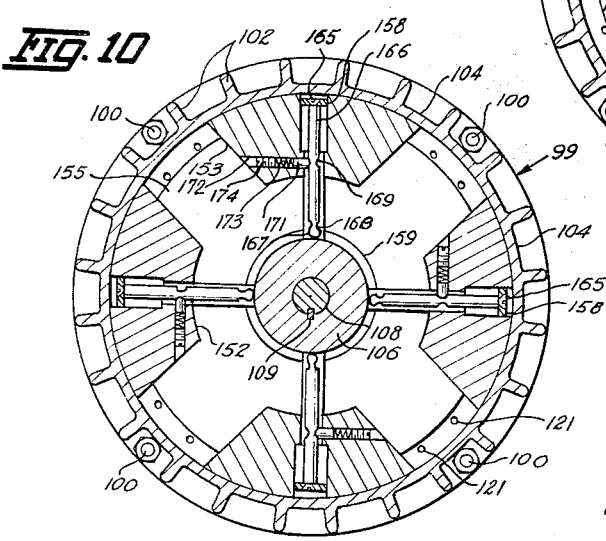

United States Patent Office 3,162,015
Patented Dec. 22, 1964

3,162,015
VEHICLE DRIVE MECHANISM
Frank A. De Puydt, 200 SW. 16th, Des Moines, Iowa
Filed May 21, 1963, Ser. No. 281,906
12 Claims. (Cl. 60—54)

This invention relates to a drive mechanism for a motor vehicle and more particularly to a drive mechanism having a hydraulic power transmitting coupling drivably connecting the motor with the drive wheels of the vehicle.

It is the object of the invention to provide in a motor vehicle an improved automatic fluid drive mechanism for transmitting power from the motor to the drive wheels of the vehicle.

Another object of the invention is to provide a hydraulic power transmitting coupling in a motor vehicle drive which also functions as a clutch and differential.

A further object of the invention is to provide a hydraulic power transmitting coupling between a driven member and a drive member which is operative in response to predetermined speeds of rotation of the drive member to establish predetermined operational speeds of the driven member.

Still another object of the invention is to provide a motor operated vehicle with a hydraulic drive coupling which maintains the vehicle against creeping movement until a pre-selected r.p.m. of the vehicle motor is reached.

An additional object of the invention is to provide a compact, reliable and rugged hydraulic power transmitting coupling which is versatile and efficient in use and economical in construction.

FIG. 7 is a sectional view of a modified form of fluid clutch usable in the power transmitting system of FIG. 2;

FIG. 8 is a sectional view taken along the line 8—8 of FIG. 7;

FIG. 9 is a fragmentary sectional view taken along the line 9—9 of FIG. 7; and

FIG. 10 is a sectional view similar to FIG. 8 showing parts thereof in a changed position.

Figure 1:
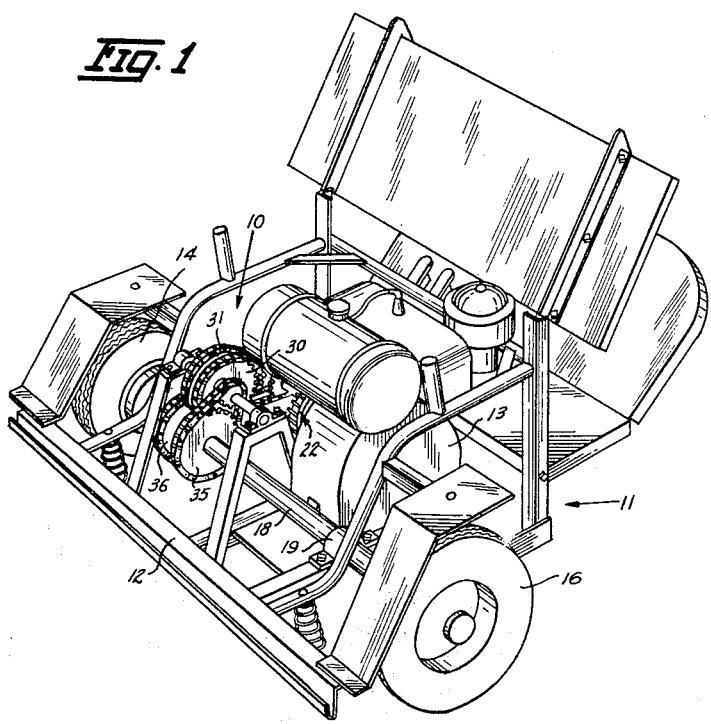
FIG. 1 is a perspective view of a motor vehicle having the hydraulic power transmitting system of this invention.
Figure 2:
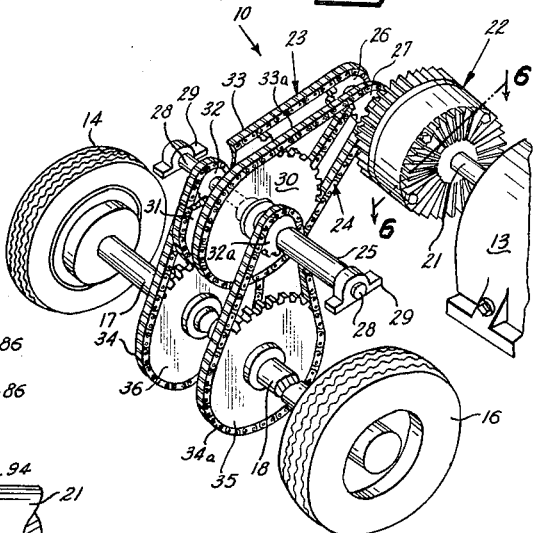
FIG. 2 is an enlarged perspective view of the power transmitting system of FIG. 1.

Referring to the drawing, there is shown in FIG. 1 the hydraulic drive mechanism of the invention indicated generally by the numeral 10 in assembled relation with a motor vehicle 11, such as a power driven lawn-mower or golf cart. The vehicle 11 comprises a frame 12 for supporting an engine 13 such as a conventional air cooled internal combustion motor. A pair of drive wheels 14 and 16 are mounted on the frame 12 by separate axles 17 and 18 (FIG. 2). Bearings 19 (FIG. 1) rotatably mount the axles 17 and 18 on the frame 12.

As shown in FIG. 2, the engine 13 has a power output shaft 21 which is operatively connected to the axles 17 and 18 of the drive mechanism 10 by means including a hydraulic power transmitting coupling 22 connected to the shaft 21 and operable to transmit power through separate chain and sprocket drives 23 and 24 to the axles 17 and 18, respectively. The chain and sprocket drives 23 and 24 are identical in construction and are connected in a driven relation with the hydraulic power transmitting coupling 22 by means of separate sprockets 26 and 27, respectively.

The chain and sprocket drive 23 includes a jack shaft 28 mounted at each end by bearings 29 on the frame 12. A large sprocket 31 and small sprocket 32 are mounted on the shaft 28. A roller chain 33 drivably connects the sprocket 26 and sprocket 31 and a roller chain 34 drivably connects the sprocket 32 with a sprocket 36 mounted on the axle 17. The chain and sprocket drive 24 includes a tubular sleeve 25 rotatably mounted on the jack shaft 28. The sleeve 25 carries a large sprocket 30 which is drivably connected to the sprocket 27 by a roller chain 33a and a small sprocket 32a which is drivably connected by a roller chain 34a to a sprocket 35 mounted on axle 18.

Figure 3:
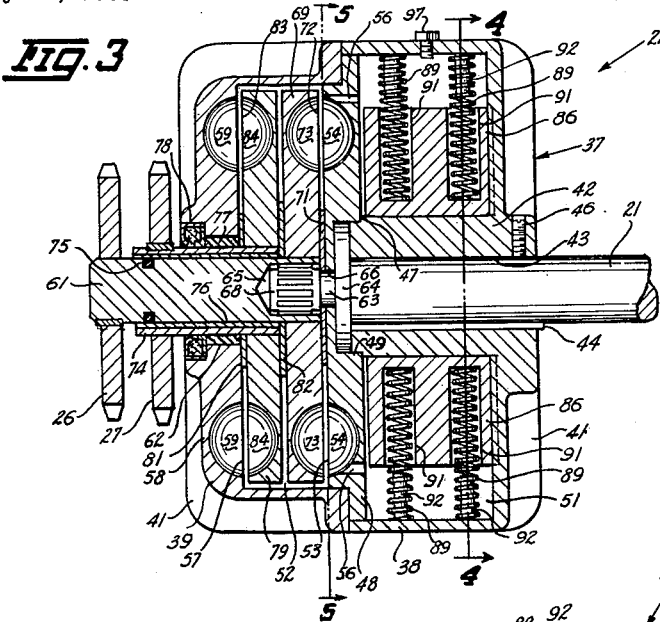
FIG. 3 is an enlarged sectional view of the fluid clutch of the power transmitting system of FIG. 2.

The power transmitting coupling 22, shown in FIG. 3, comprises a cylindrical housing 37 formed by a pair of mating cup-shaped members 38 and 39 having circumferentially spaced cooling fins 41. Bolts 40, shown in FIGS. 4 and 5, secure the members 38 and 39 together. The member 38 has an inwardly extended central hub 42 formed with a bore 43 for receiving the power output shaft 21 of the engine 13. A key 44 extended radially from the shaft 21 is positioned in a slot longitudinally along the bore 43 to drivably connect the shaft 21 with the housing 37. A set screw 46 radially threaded into the hub 42 engages the shaft 21 to longitudinally maintain the housing 37 on the shaft 21. The inner end of the central hub 42 has a reduced diameter defining an annular abutment 47. A circular disc 48 having a central circular recess 49 fits over the inner end of the hub 42 and is in engagement with the annular abutment 47. The disc 48 divides the housing 37 into a first fluid containing chamber 51 and a second fluid containing chamber 52.

The side of the circular disc 48 in the second chamber 52 has a plurality of circumferentially spaced pockets or recesses 54 each having a concave hemispheroidal shape. The outer edges of adjacent recesses define radial vanes 53 which extend circumferentially around the disc 48. The vanes 53 are inclined at about 20 degrees with respect to an axial plane and extend outwardly in the direction of rotation of the disc 48. Extended transversely through the circular disc 48 adjacent the outer edge of the pockets 54 are a plurality of bores 56 which provide a passage for the flow of fluid between the first and second chambers 51 and 52, respectively.

As shown in FIG. 3, the cup-shaped housing member 39 has radially extended and circumferentially spaced vanes 57 on the inner surface of the end wall 58. The vanes 57 are defined by a series of circumferentially spaced hemispheroidal shaped pockets or recesses 59 and are inclined about 20 degrees with respect to an axial plane and extend in the same direction as the vanes 53.

A shaft 61 positioned in axial alignment with the central hub 42 carries the sprocket 26 and extends into the second chamber 52 through a central bore 62 in the end wall 58. A stub shaft 63 having a disc shape head 64 extends through a central hole 66 in the circular disc 48 and into a recess 65 in the adjacent end of the shaft 61. The head 64 is seated in the central recess 49 of the circular disc 48 and is retained therein by the bolts 40 which clamp the cup-shaped housing members 38 and 39 together. The shaft 61 is rotatably supported on the stub shaft 63 by roller bearings 68 interposed in the recess 65 and engageable with the shafts 61 and 63.

Figure 6:
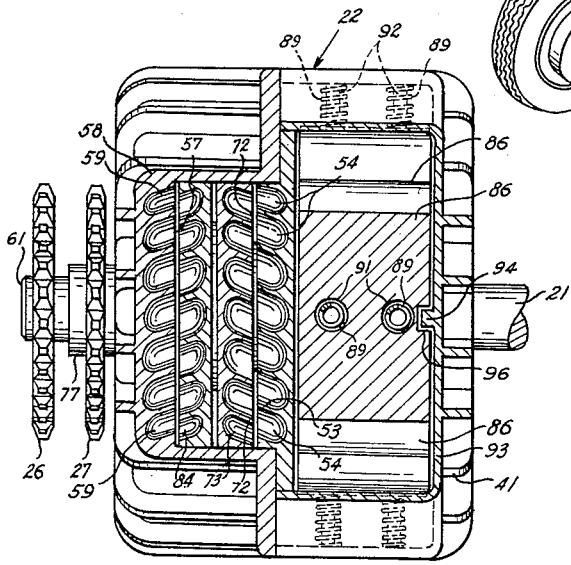
FIG. 6 is a sectional view taken along the line 6—6 of FIG. 2.

A first disc or turbine rotor 69 is positioned in the second chamber 62 adjacent the circular disc 48 and secured to the shaft 61. A washer or collar 71 positioned concentrically around the stub shaft 63 spaces the disc 69 from the circular disc 48. The side of the disc 69 facing the circular disc 48 has a plurality of radially extended and circumferentially spaced vanes 72 defined by hemispheroidal-shaped pockets or recesses 73 which are concentric with and spaced opposite the pockets 54 in the circular disc 48 (FIG. 6). The vanes are inclined about 20 degrees and extend outwardly in a direction substantially parallel to vanes 53 in the disc 48.

A tubular sleeve 74 is rotatably mounted on the shaft 61 by sleeve bearing 76 and extends through the bore 62 in the end wall 58 into the second chamber 52. An annular oil sealing ring 75 is positioned in a circumferential groove in the shaft 61 and engages the sleeve bearing 76. The sprocket 27 is secured to the sleeve 74. A sleeve bearing 77 positioned in the bore 62 rotatably mounts the tubular sleeve 74 on the end wall 58. An annular oil sealing ring 78 is positioned around the tubular sleeve 74 adjacent the bearing 77.

A second disc or turbine rotor 79 is positioned in the chamber 52 adjacent the end wall 58 and is secured to the tubular sleeve 74. Washers 81 and 82 space the disc 79 from the end wall 58 and the first disc 69, respectively. The side of the disc 79 facing the end wall 58 has a plurality of radial extended vanes 83 integrally formed therewith. The vanes 83 are circumferentially spaced around the disc 79 and are defined by hemispheroidal-shaped pockets 84 in concentric alignment with the pockets 59 in the end wall 58 (FIG. 6). The vanes 83 are inclined about 20 degrees and extend outwardly in a direction substantially parallel to the vanes 57 in the housing member 39.

Figure 4:
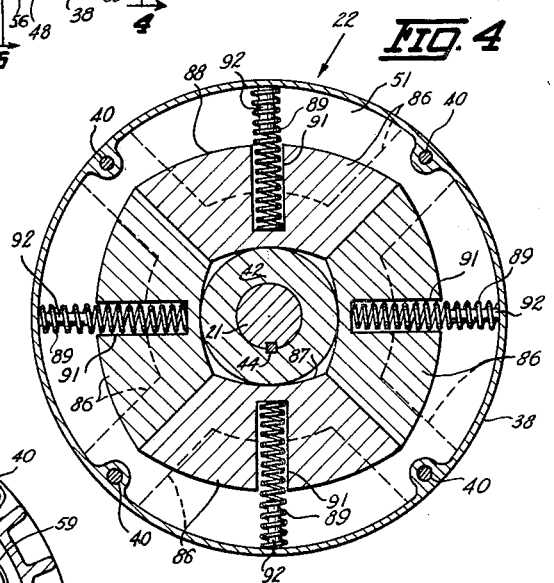
FIG. 4 is a sectional view taken along the line 4—4 of FIG. 3.
Figure 5:
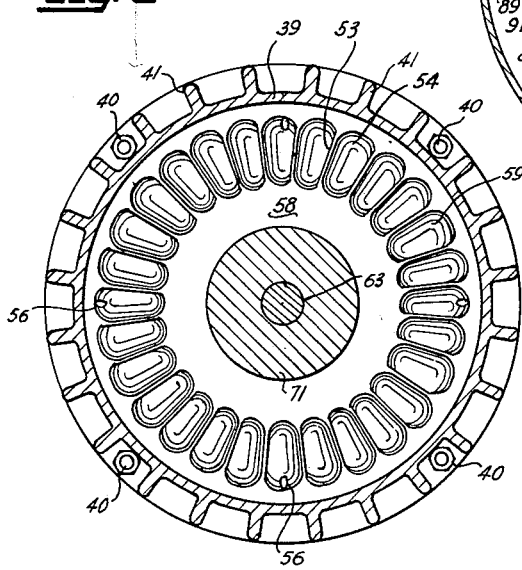
FIG. 5 is a sectional view taken along the line 5—5 of FIG. 3.

As shown in FIGS. 4 and 6, a plurality of slide blocks 86 are positioned in the first chamber 51. Each block has an inner arcuate surface 87 which is engageable with the central hub 42 and an outer arcuate surface having a curvature corresponding to the curvature of the inner peripheral wall of the cup-shaped housing 38. A pair of compression springs 89 radially interposed between the housing 38 and each block 86 biases the block toward the hub 42. As shown in FIG. 3, each block 86 has a pair of radial wells 91 for receiving the compression springs 89. The outer ends of the compression springs 89 are maintained in alignment with the radial wells 91 by projections 92 on the housing 38.

Each of the blocks 86 is drivably connected to the end wall 93 of the cup-shaped housing 38 by separate radially extended tongues 94 corresponding in number to the number of blocks (FIG. 6). The tongues 94 extend into radial grooves 96 in the sides of the blocks 86 thereby guiding the blocks for radial movement in the chamber 51.

The chambers 51 and 52 are partially filled with a hydraulic fluid, such as oil. A plug 97 in the housing 38 as shown in FIG. 3 is removable to provide a filler opening into the chamber 51.

In the forward operation of the vehicle 11, the engine 13 is started and when running, continuously rotates the power output shaft 21. When the engine is idling the shaft 21 rotates the housing 37 at a slow speed. The hydraulic fluid in the second chamber 52 is minimal and does not form a fluid drive connection between the housing and the discs 69 and 79. Thus the chain and sprocket drives 23 and 24 are not operated and the vehicle is at a standstill.

When it is desired to move the vehicle in a forward direction the speed of the engine 13 is increased thereby rotating the shaft 21 and the housing 37 at an increased speed. An increase in speed of rotation of the housing 37 establishes a centrifugal force which moves each block 86 radially outward against the force of the compression springs 89, as shown in broken lines in FIG. 4, thereby displacing the hydraulic fluid in the first chamber 51. The hydraulic fluid displaced in the first chamber 51 by the blocks 86 flows through the bores 56 in the circular disc 48 into the second chamber 52 thereby increasing the volume of hydraulic fluid in the chamber 52. The increased volume of hydraulic fluid in the second chamber 52 establishes a hydraulic drive connection between the rotating housing 37 and the discs 69 and 79. The hydraulic fluid in the second chamber 52 is carried in a circumferential direction by the inclined vanes 53 and 57 of the circular disc 48 and the end wall 58, respectively, and forms a driver impeller acting on the hydraulic fluid in the second chamber 52. The vanes 72 and 83 on the discs 69 and 79, respectively, form turbine blades which receive the moving fluid which rotates the discs 69 and 79. The greater the speed of rotation of the housing 37 the greater the driving torque applied to the discs 69 and 79 by the moving hydraulic fluid in the second chamber 52. The driven impellers and turbine rotors function as a fluid clutch as the coupling 22 does not transmit torque when the driver impellers are rotating at a slow rate of speed.

When the speed of the engine 13 is reduced the blocks 86 move radially inwardly whereby the hydraulic fluid in the second chamber 52 will flow back through the bores 56 in the central disc into the first chamber 51 to a level defined by the radial location of the bores 56 in the disc.

Each drive wheel 14 and 16 is separately driven by the hydraulic power transmitting coupling 22 as the discs 69 and 79 are driven independent of each other. The rotating discs 69 and 79 separately drive the sprockets 26 and 27 through the connecting shaft 61 and tubular sleeve 77, respectively. One of the discs may be driven while the other is held in a fixed position so that the coupling 22 performs the function of a drive differential.

In order to operate the vehicle 11 in a reverse direction, the power train between the vehicle wheels 14 and 16 and the drive coupling 22 may be provided with a reversing gear unit (not shown) which is driven by the chain and sprocket drives 23 and 24 and connected to the axles 17 and 18.

A modified power transmitting coupling 98 is shown in FIGS. 7 to 10.

As shown in FIG. 7, the coupling 98 has mating cup-shaped housing members 99 and 101 provided with external cooling fins 102. Bolts 100 secure the housing members 99 and 101 together (FIGS. 8 and 10). The housing member 99 has a disc-shaped side wall 103 integrally jointed with a circular peripheral wall 104. A central axially extended hub 106 is integrally connected to the central portion of the wall 103. The hub 106 has an axial bore 107 for receiving the power ouptut shaft 108 of an engine (not shown). A key 109 extended radially from the shaft 108 is positioned in a radial slot which projects axially along the bore for drivably connecting the shaft 108 with the housing member 99. A set screw 111 radially threaded in the hub 106 engages the shaft 108 and functions to prevent axial movement of the shaft 108 relative to the hub 106.

The inner end of the hub 106 has a reduced diameter defining an annular abutment 112. A substantially flat circular disc 113 having a central bore 114 is positioned about the inner end of the hub 106 in engagement with the annular abutment 112. The disc 113 separates the cup-shaped housing members 99 and 101 and forms therewith a first fluid containing chamber 116 and a second fluid containing chamber 117.

The surface of the disc 113 which defines one of the walls of the second chamber 117 has a plurality of radially extended and circumferentially spaced vanes 118 which are defined by a circumferential series of spaced pockets or recesses 119. The portion of the disc 117 forming the pockets 119 has a concave hemispheroidal shape with the outer edges thereof defining the radial vanes 118 which are inclined about 20 degrees with respect to an axial plane and extend outwardly in the direction of rotation of the disc 113. A passage for the flow of hydraulic fluid between the first and second chambers 116 and 117, respectively, is provided by transverse bores 121 which extend through the disc 113 adjacent the outer edge of the pockets 119.

The cup-shaped housing 101 has a radial side wall 122 integrally joined with a circumferential peripheral wall 123. The peripheral wall 104 of the housing member 99 and the peripheral wall 123 of the housing member 101 engage a peripheral flange 124 on the disc 113 and are secured thereto by the bolts 100. The section of the side wall 122 facing the second fluid containing chamber 117 has radially extended and circumferentially spaced vanes 126 which are defined by a circumferential series of hemispheroidal-shaped pockets or recesses 127 which are substantially identical to the pockets 119 in the disc 113.

A first circular turbine rotor 128 is positioned in a side-by-side relation with respect to the disc 113. The rotor 128 is mounted on a shaft 129 which extends into the housing member 101. The inner end of the shaft 129 is rotatably mounted by means of bearings 131 on a stub axle 132 which has an enlarged circular head 133 seated within the bore 114 of the disc 113 and interposed between the hub 106 and the disc 113. The space between the first rotor 128 and disc 113 is maintained by a flat washer 134 interposed about the stub shaft 132 and in engagement with the central portions of the disc 113 and rotor 128. The rotor 128 has a circumferential series of spaced radial vanes 136 which face and are in concentric alignment with the vanes 118 in the disc 113. The vanes 136 are defined by series of circumferentially spaced hemispheroidal-shaped pockets or recesses 137 and are inclined about 20 degrees and extend substantially parallel to the vanes 118 in the disc 113.

A tubular sleeve 138 is rotatably mounted about the shaft 129 by bearings 139 and projects through a central bore 141 in the side wall 122. A sleeve bearing 142 rotatably mounts the tubular sleeve 138 on the housing side wall 122. An annular oil seal 143 is interposed between the side wall 122 and the tubular sleeve 138 adjacent the outside edge of the bearing 142.

A second turbine rotor 144 is located in the second chamber 117 and is spaced from the side wall 122 and rotor 128 by annular washers 146 and 147 positioned about the sleeve 138 and shaft 129, respectively. The side of the second rotor 144 facing the side wall 122 has a plurality of radially extended and circumferentially spaced vanes 148 defined by a circumferential series of hemispheroidal-shaped pockets or recesses 149 which are in circular alignment with the pockets 127 in the side wall 122. The vanes 148 are inclined about 20 degrees and extend substantially parallel to the vanes 126 in the housing side wall 122.

A cage unit 150 positioned within the first chamber 116 carries a plurality of fluid displacing blocks 151 which move radially outwardly in response to the speed of rotation of the cage unit. As shown in FIG. 7, the cage unit 150 comprises a pair of discs 154 and 155 positioned adjacent the housing side wall 103 and circular disc 113, respectively. A plurality of U-shaped members 158 corresponding in number to the number of blocks 151 are circumferentially spaced around the chamber 116 and secured to each disc 154 and 155 by bolts 161. The U-shaped members 158 and discs 154 and 155 form the cage unit 150 which is rotatably mounted on the hub 106 by annular bearings 159 having a right angle cross section. The bearings 159 are interposed between the inner periphery of the discs 154 and 155 and the hub 106 and between the side of the discs 154 and 155 and the corresponding adjacent housing side wall 103 and circular disc 113 so as to maintain clearance between the discs 154 and the housing side wall 103 and circular disc 113.

A pair of compression springs 156 are radially interposed between each block 151 and the base of the associated U-shaped member 158. Projections 160 secured to the base of the U-shaped member 158 extend radially inwardly into the outer ends of the springs 156 to maintain the springs 156 in engagement with the member 158. The inner end of each spring 156 is disposed in a well 157 opening at the outer surface 153 of the block.

The blocks 151 are substantially identical in construction. The following description is limited to one of the blocks. Block 151 has inner curved surface 152 which is engageable with the hub 106 and an outer curved surface 153 having a contour substantially equal to the inner contour of the peripheral wall 104 of the housing member 99. As shown in FIG. 9, the sides of the block 151 have rectangular-shaped grooves 162 for receiving the legs of the U-shaped member 158. The outer curved surface 153 of a block has a transverse groove 163 adapted to receive the base of a U-shaped member 158 as shown in FIG. 10.

The radial in and out position of the block 151 is defined by a releasable locking assembly indicated generally as 164 as shown in FIG. 8. The assembly 164 includes a rod 166 secured at its outer end to the U-shaped member 158 by a bolt 165 and extended toward and terminating adjacent the hub 106. The rod extends into a countersunk bore 167 which is in the central section of the block 151 in alignment with the wells 157. The rod 166 has an inner annular notch 168 and an outer annular notch 169 which define the stop positions of the block 151.

A detent plunger 171 is slidably disposed in a transverse bore 172 in the block 151. The plunger 171 is biased into engagement with the rod 166 by a compression spring 173 retained in the bore 172 by a screw 174. Adjustment of the screw 174 varies the biasing force of the spring 173. The annular notches 168 and 169 coact with the plunger 171 and define catch portions which releasably hold the block 151 in selected radial positions.

In use, the chambers 116 and 117 are partially filled with a hydraulic fluid such as oil. The fluid is placed within the chambers by removing a normally closed plug 176 on the peripheral wall 104 shown in FIG. 7. The hydraulic fluid in the first chamber 116 flows into the second chamber 117 through the bores 121 in response to the speed of rotation of the cage unit 150. When the engine rotates the drive shaft 108 at a slow speed the cage 150 turns in response to oil moved by the rotating housing member 99. The blocks 151 are held in their "in" position in engagement with the hub 106 by the biasing force of the springs 156 and are retained in the "in" position until the speed of the engine is increased. With an increase in the speed of rotation of the housing member 99 the moving oil in the first chamber 116 drives the cage unit 150 increasing its speed of rotation. When cage unit 150 is turning at a predetermined rate of speed centrifugal force moves the rotating blocks radially outward against the force of the compression springs 156. The cage unit 150 being rotatably mounted on the hub 106 by bearings 159 and driven by the circular movement of oil in the chamber 116 maintains a relatively even rate of speed during sharp variations in the speed of the engine. When a single cylinder engine is used to drive the coupling 98, the oil driven cage unit 150 dampens the power surges or impulses transmitted to the blocks 151.

As shown in FIG. 10, when the blocks are moved to the radial "out" position the spring biased detent plunger 171 is seated in the outer notch 168 of the rod 166 thereby holding the blocks 151 in the "out" position. When the blocks 151 are in the "out" position the hydraulic fluid in the first chamber 116 is forced or displaced through the passages or bores 121 into the second chamber thereby increasing the volume of hydraulic fluid in the second chamber. This establishes a hydraulic drive connection between the rotating housing member 101 and disc 113 and the first and second turbine rotors 128 and 144, respectively. The hydraulic fluid in the second chamber 117 is carried in a circumferential direction by the vanes 118 on the disc 113 and the vanes 149 on the housing side wall 122. The vanes 136 and 148 on the first and second rotors 128 and 144, respectively, receive the moving hydraulic fluid which rotates the rotors. The greater the speed of rotation of the housing 101 and disc 113 the greater the driving torque applied to the rotors by the moving hydraulic fluid in the second chamber 117.

The rotating rotors 128 and 144 separately drive sprockets 178 and 179 through the connecting shaft 129 and the tubular sleeve 138. Each sprocket 178 and 179 is separately driven by the hydraulic power transmitting coupling 98 as the first and second rotors 128 and 144 are independently driven. One of the rotors may be driven while the other is held in a fixed position so that the coupling 98 performs the function of a drive differential.

The blocks 151 will remain in the "out" position, as shown in FIG. 10, until the rotational speed of the cage unit 150 falls below a predetermined minimum which is sufficient for the compression springs 156 to move the spring biased detent 171 out of engagement with the outer annular notch 168. The holding action of the lock assembly 164 defines the radial movement of the block 151 to a pre-selected position corresponding to a predetermined range of speeds of engine operation. For example, the lock assembly 164 will hold the block 151 in the "in" position until the speed of the engine equals or exceeds 1500 r.p.m. At this speed the cage unit 150 will be driven by the oil in chamber 116 at a rate of speed which is sufficient to establish a centrifugal force to move and hold the blocks in the "out" position. When the engine speed equals or falls below 1200 r.p.m. the compression springs 156 will move the blocks 151 back to the "in" position.

As shown in FIG. 8 when the blocks 151 are in the "in" position the detent plunger 171 is biased by the compression spring 173 into engagement with the annular inner notch 168 thereby holding the blocks 151 in the "in" position. With the blocks 151 in the "in" position the hydraulic fluid in the second chamber 117 will flow back through the bores 121 in the disc 113 into the first chamber 116 until the levels of the hydraulic fluid in the chambers are substantially equalized.

While there have been shown, described, and pointed out the fundamental novel features of the invention, it will be understood that various omissions, substitutions, changes in form and details of the apparatus illustrated may be made by those skilled in the art, without departing from the spirit of the invention. It is intended to be limited only as indicated by the scope of the following claims.

I claim:
1. A drive mechanism for coupling a power input shaft with first and second power output shafts comprising:
    (a) housing means operably connected to said input shaft for rotation thereby, said housing means having axially spaced end walls and a middle wall dividing the housing means into first and second chambers, said middle wall having at least one passage providing fluid communication between said chambers, and vane means located in said second chamber,
    (b) a first driven shaft rotatably mounted on said housing means with a portion thereof positioned in said second chamber,
    (c) first rotor means positioned in said second chamber and secured to said first shaft for rotation therewith, said first rotor means having vane members projected toward the vane means on the housing means,
    (d) a second driven shaft mounted on said housing means with a portion thereof positioned in said second chamber,
    (e) a second rotor means positioned in said second chamber and secured to said second shaft for rotation therewith, said second rotor means having vane members projected toward the vane means on the housing means,
    (f) power transmitting means connecting the first driven shaft to one of the output shafts and connecting the second driven shaft to the other of the output shafts
    (g) a plurality of hydraulic fluid displacing blocks circumferentially positioned in said first chamber, said blocks being responsive to the speed of rotation of said housing means for moving hydraulic fluid from said first chamber to said second chamber thereby establishing a fluid drive connection between said housing means and said first and second rotor means, and
    (h) cage means positioned in said first chamber and rotatably mounted on said housing means, said cage means operatively supporting said blocks for movement in radial directions.

2. The drive mechanism defined in claim 1 wherein said cage means comprises
    (a) a cage unit supported on said housing means in said first chamber for rotation about the axis of said housing means, said cage unit providing a radial guide for said blocks,
    (b) rod means equal in number to the blocks, said rod means operably connected to said cage unit and extended radially into said blocks and having radial inner and outer groove means on the section thereof within the blocks,
    (c) spring biased detent means carried by the blocks and engageable with said rod means, said detent means normally positioned in the inner groove means and carried by the block into the outer groove means in response to an increase of speed of rotation of said housing means, and
    (d) spring means engaging each of said blocks and said cage unit for biasing said blocks radially inward to position the detent means in the inner groove means.

3. The drive mechanism defined in claim 1 wherein said cage means comprises
    (a) means operably connected to said housing means and extended radially relative to said blocks,
    (b) said means and blocks having coacting catch portions which releasably hold the blocks in selected radial positions, and
    (c) spring means engaging the blocks to bias the blocks radially inward.

4. A hydraulic fluid power transmission coupling comprising:
    (a) a power input shaft,
    (b) housing means secured to said input shaft for rotation therewith, said housing means having first and second fluid chambers therein and vane means located in the second chamber,
    (c) a first tubular shaft rotatably mounted on said housing means and extended into said second chamber of the housing means,
    (d) first vaned rotor means positioned in said second chamber and mounted on said tubular shaft in a fluid coacting relation with the vane means of the housing means,
    (e) a second shaft rotatably mounted concentrically within said first tubular shaft with a portion thereof positioned in said second chamber of the housing means,
    (f) second vaned rotor means positioned in said second chamber adjacent said first rotor means and secured to said second shaft in a fluid coacting relation with the vane means of the housing means,
    (g) fluid displacing means within said first chamber responsive to the speed of rotation of said housing means for moving fluid from said first chamber to said second chamber to provide a fluid connection between said housing means and said first and second rotor means, and
    (h) cage means supported on said housing means in said first chamber for relative rotation with respect to said housing means, said fluid displacing means being slidably connected to a portion of said cage means for relative radial movement.

5. A power transmission coupling comprising:
    (a) a drive member adapted to be rotated,
    (b) housing means connected to said drive member and rotatable therewith, said housing means having spaced end walls and an intermediate wall dividing the housing means into first and second hydraulic fluid chambers, said intermediate wall having at least one passage therein providing fluid communication between said chambers and vane means located in the second chamber, (c) a driven member rotatably mounted on said housing means with a portion thereof positioned in said second chamber, (d) rotor means positioned in said second chamber and secured to said driven member for rotation therewith, said rotor means having vane members projected toward the vane means on the housing means, (e) a plurality of hydraulic fluid displacing blocks circumferentially positioned in said first chamber, said blocks being responsive to the speed of rotation of said housing means for moving hydraulic fluid from said first chamber through the passage in the intermediate wall into said second chamber, thereby establishing a fluid connection between said housing means and said rotor means, and (f) means supported on said housing means in said first chamber for relative rotation with respect to said housing means for slidably carrying said fluid displacing means radially toward and away from the axis of rotation of the housing means.

6. A power transmission coupling comprising:
(a) a drive member adapted to be rotated,
(b) housing means connected to said drive member and rotatable therewith, said housing means having first and second fluid chambers and at least one passage providing fluid communication between said chambers,
(c) a driven member rotatably mounted on said housing means with a portion thereof positioned in said second chamber,
(d) coacting driving and driven vaned means positioned in said second chamber, said driven vaned means being secured to said driven member for rotation therewith and said driving vaned means being mounted for rotation with said housing means,
(e) fluid displacing means disposed in said first chamber responsive to the speed of rotation of said housing means for moving hydraulic fluid from said first chamber to said second chamber to provide a fluid connection between said coacting means, and
(f) means supported on said housing means in said first chamber for relative rotation with respect to said housing means for slidably carrying said fluid displacing means radially toward and away from the axis of rotation of the housing means.

7. A power transmission coupling comprising:
(a) a drive member adapted to be rotated,
(b) housing means connected to said driving member and rotatable therewith, said housing means having first and second hydraulic fluid chambers and at least one passage providing fluid communication between said chambers and vane means located in the second chamber,
(c) a driven member rotatably mounted on said housing means with a portion thereof positioned in said second chamber,
(d) rotor means positioned in said second chamber and secured to said driven member for rotation therewith, said rotor means having vane members projected toward the vane means on the housing means,
(e) at least one hydraulic fluid displacing block positioned in said first chamber and mounted for movement radially of said housing means, said block being responsive to the speed of rotation of said housing means for moving hydraulic fluid from said first chamber through the passage into said second chamber thereby establishing a fluid connection between said housing means and said rotor means, and (f) cage means supported on said housing means in said first chamber for relative rotation with respect to said housing means for slidably carrying said block radially toward and away from the axis of rotation of the housing means.

8. A power transmission coupling comprising:
(a) a drive shaft adapted to be rotated,
(b) housing means connected to said drive shaft for rotation therewith, said housing means having axially spaced end walls and a middle wall dividing the housing means into a first and second chamber, said middle wall having at least one passage providing fluid communication between said chambers,
(c) blade means circumferentially spaced around and connected to the middle wall and end wall of the second chamber, said blade means facing each other,
(d) a first driven tubular shaft rotatably mounted on said housing means with a portion thereof positioned in said second chamber,
(e) first rotor means positioned in said second chamber adjacent the end wall thereof and secured to said first shaft for rotation therewith, said first rotor means having vane members projected toward the end wall in a fluid coacting relation with the blade means on said end wall,
(f) a second driven shaft rotatably mounted concentrically within said first shaft with a portion thereof positioned in said second chamber,
(g) second rotor means positioned in said second chamber adjacent the middle wall of the housing means and secured to said second shaft for rotation therewith, said second rotor means having vane members projected toward the middle wall in a fluid coacting relation with the blade means on the middle wall,
(h) a plurality of hydraulic fluid displacing blocks circumferentially positioned in said first chamber, said blocks being responsive to the speed of rotation of said housing means for moving hydraulic fluid from said first chamber to said second chamber thereby establishing a fluid drive connection between said housing means and said first and second rotor means,
(i) spring means engaging each of said blocks and the housing means for biasing said blocks radially toward the axis of rotation of said housing means, and
(j) cage means supported on said housing means in said first chamber for relative rotation with respect to said housing means for slidably carrying said fluid displacing blocks radially toward and away from the axis of rotation of the housing means.

9. A power transmission coupling comprising:
(a) a drive shaft adapted to be rotated,
(b) housing means connected to said drive shaft for rotation therewith, said housing means having axially spaced end walls and a middle wall dividing the housing means into a first and second chamber, said middle wall having at least one passage providing fluid communication between said chambers,
(c) blade means circumferentially spaced around and connected to the end wall of the second chamber,
(d) a driven shaft rotatably mounted on said housing means with a portion thereof positioned in said second chamber,
(e) rotor means positioned in said second chamber adjacent the end wall thereof and secured to said first shaft for rotation therewith, said rotor means having vane members projected toward the end wall in a fluid coacting relation with the blade means on the end wall,
(f) at least one hydraulic fluid displacing block positioned in said first chamber, said block being responsive to the speed of rotation of said housing means for moving hydraulic fluid from said first chamber to said second chamber thereby establishing a fluid drive connection between said housing means and said rotor means, and (g) cage means supported on said housing means in said first chamber for relative rotation with respect to said housing means for slidably carrying said block radially toward and away from the axis of rotation of the housing means.

10. The power transmission coupling defined in claim 9 wherein the cage means includes:
   (a) means extended radially into said block, said means having radial inner and outer groove means, and
   (b) spring biased detent means carried by the block and engageable with said means, said detent means normally positioned in the inner groove means and carried by the block into the outer groove means in response to an increase of speed of rotation of said housing means.

11. A power transmission coupling comprising:
   (a) a drive member adapted to be rotated,
   (b) housing means connected to said drive member and rotatable therewith, said housing means having first and second hydraulic fluid chambers and at least one passage providing fluid communication between said chambers, and blade means located in said second chamber,
   (c) a driven member rotatably mounted on said housing means with a portion thereof positioned in said second chamber,
   (d) rotor means positioned in said second chamber and secured to said driven member for rotation therewith, said rotor means having blade members projected toward the blade means on the housing means,
   (e) at least one hydraulic fluid displacing block positioned in said first chamber and mounted for movement radially of said housing means, said block being movable in response to the speed of rotation of said housing means to move hydraulic fluid from said first chamber through the passage into said second chamber whereby to establish a fluid connection between said housing means and said rotor means,
   (f) means operably connected to said housing means and extended radially into said block, said means having radial inner and outer groove means,
   (g) spring biased detent means carried by the block and engageable with said radially extended means, said detent means normally positioned in the inner groove means and carried by the block into the outer groove means in response to an increase of speed of rotation of said housing means, and
   (h) means engageable with said block for biasing said block radially inward to position the detent means in the inner groove means.

12. A power transmission coupling comprising:
   (a) a drive member adapted to be rotated,
   (b) housing means connected to said drive member and rotatable therewith, said housing means having first and second hydraulic fluid chambers and at least one passage providing fluid communication between said chambers, and blade means located in said second chamber,
   (c) a driven member rotatably mounted on said housing means with a portion thereof positioned in said second chamber,
   (d) rotor means positioned in said second chamber and secured to said driven member for rotation therewith, said rotor means having blade members projected toward the blade means on the housing means,
   (e) at least one hydraulic fluid displacing block positioned in said first chamber and mounted for movement radially of said housing means, said block being movable in response to the speed of rotation of said housing means for moving hydraulic fluid from said first chamber through the passage into said second chamber thereby establishing a fluid connection between said housing means and said rotor means, and
   (f) means operably connected to said housing means and extended radially relative to said block, said radially extended means and block having coacting catch portions which releasably hold the blocks in selected radial positions, and
   (g) spring means engaging the blocks to bias the blocks radially inward.

References Cited in the file of this patent
UNITED STATES PATENTS

| | | |
|---|---|---|
| 2,385,263 | Ericson et al. | Sept. 18, 1945 |
| 2,397,862 | Jencick | Apr. 2, 1946 |
| 2,468,107 | Powell | Apr. 26, 1949 |
| 2,549,557 | Yancho et al. | Apr. 17, 1951 |